United States Patent
Lin (10) Patent No.: US 9,913,334 B2
(45) Date of Patent: Mar. 6, 2018

(54) TIMING DEVICE

(71) Applicant: Chia-Hua Lin, New Taipei (TW)

(72) Inventor: Chia-Hua Lin, New Taipei (TW)

(*) Notice: Subject to any disclaimer, the term of this patent is extended or adjusted under 35 U.S.C. 154(b) by 347 days.

(21) Appl. No.: 14/857,617

(22) Filed: Sep. 17, 2015

(65) Prior Publication Data
US 2017/0085082 A1 Mar. 23, 2017

(51) Int. Cl.
*H05B 33/08* (2006.01)
*H02J 3/14* (2006.01)
*H02M 7/06* (2006.01)
*H02M 1/00* (2006.01)

(52) U.S. Cl.
CPC .......... *H05B 33/0842* (2013.01); *H02J 3/14* (2013.01); *H02J 2003/143* (2013.01); *H02M 7/06* (2013.01); *H02M 2001/0006* (2013.01); *Y02B 70/3225* (2013.01); *Y04S 20/222* (2013.01)

(58) Field of Classification Search
CPC .......... H02J 3/00; H05B 33/0842; H02M 7/06
See application file for complete search history.

(56) References Cited

U.S. PATENT DOCUMENTS

2013/0063042 A1* 3/2013 Bora ................ H05B 33/0863
315/292

* cited by examiner

*Primary Examiner* — Jeffrey Shin
(74) *Attorney, Agent, or Firm* — WPAT, PC (57) ABSTRACT

A timing device, which comprises at least two time setting display lights, with each of the time setting display lights representing an AC power supply time, and, after pressing a selection control button so as to light on at least two time setting display lights, by pressing the total time setting control button, the central control module can sum up the power supply times represented by all of the lighting time setting display lights to a total power supply time, and start the AC power supply to the load end as well as the power supply time countdown. Moreover, the central control module can further, based on the remaining power supply time, drive one or more time setting display lights to light on thereby indicating the remaining power supply time.

9 Claims, 12 Drawing Sheets

TIMING DEVICE

BACKGROUND OF THE INVENTION

1. Field of the Invention

The present invention generally relates to a timing device; in particular, it relates to a timing device allowing a user to press buttons and capable of summing up power supply times, in which the timing device can perform the time countdown on the totally summed power supply time and display the remaining power supply time by means of the time setting display lights configured on the surface of the timing device.

2. Description of Related Art

Prior art power socket devices enabling timing function mostly include a timer, in which the timer may be a mechanical countdown timer. Taking a timer configured with a wheel as an example, the user needs to rotate the wheel on the timer to set up the desired countdown time in order to control the power supply of the power socket device, thus saving the electric power consumption of the electric apparatus plugged onto the power socket device.

However, see that this type of mechanical countdown timers may provide only basic functions, and the extent of rotation directly indicates the duration of the power supply time, it is usually not possible to set up a longer power supply time. In addition, since the power supply time determined by rotations on such mechanical countdown timers is limited, the user actually does not have too many choices for power supply time selections. Moreover, the mechanical countdown timers are unable to display the currently remaining power supply time, so the user can not precisely appreciate the currently remaining power supply time, but simply has to rely on the user's memory to roughly estimate it. Apparently, this type of mechanical countdown timers indeed remains significantly to be desired.

Therefore, it would be an optimal solution if a timing device can be devised, which allows a user to press buttons and select the required duration of power supply time, automatically calculate the total power supply time, perform the time countdown on the total power supply time, and display the remaining power supply time by means of the time setting display lights located on the surface of the timing device such that the user can be aware of the currently remaining power supply time.

SUMMARY OF THE INVENTION

A timing device comprises: an alternative current (AC) power source input module, used to input AC power; a direct current (DC) power source supply module, which is electrically connected to the AC power source input module and used to convert the AC power into the DC power; an AC power source output module, which is electrically connected to a load end in order to output the AC power to the load end; a relay, which is electrically connected to the AC power source input module, the DC power source supply module and the AC power source output module, wherein the relay is used to control whether the AC power inputted by the AC power source input module should pass through the relay to supply the power to the AC power source output module; a central control module, which is electrically connected to the DC power source supply module in order to control the integral operation mechanism of the timing device; a relay driver circuit, which is electrically connected to the central control module and the relay, in which the central control module is able to connect to the relay by means of the relay driver circuit such that the power can be supplied to the AC power source output module; a time setting display light set, which includes at least two or more time setting display lights and is electrically connected to the central control module, wherein each time setting display light represents a power supply time, and the light-on or light-off in any one of the time setting display lights represents the status change in the control of the central control module; a selection control button, which is electrically connected to the central control module and is used to be pressed to select the power supply time, wherein pressing the selection control button can result in the light-on or light-off of such time setting display lights; a total time setting control button, which is electrically connected to the central control module and is used to be pressed to confirm the power supply time option, wherein, upon pressing the selection control button thus leading to light-on in one of the time setting display lights, it is possible to press once again the total time setting control button to confirm the input of the time represented by the time setting display light; and in case of pressing the selection control button thereby enabling the light-on in one of the time setting display lights without subsequently pressing once again the selection control button or the total time setting control button, the central control module is able to sum up the power supply times represented by all of the lighting time setting display lights to obtain a total power supply time, and start the power supply to the load end as well as the time countdown, and, also, the central control module can further, based on the remaining power supply time acquired by deducting the elapsed power supply time from the total power supply time, drive the light-on in one or more time setting display lights thereby indicating the remaining power supply time.

In a preferred embodiment of the present invention, after pressing the total time setting control button, the central control module can re-select from the non-lighting time setting display lights in order to drive the time setting display light representing the least power supply time to light on.

In a preferred embodiment of the present invention, pressing once again the selection control button allows the lighting time setting display lights to light off, and enables the next time setting display light representing the second least power supply time to light on.

In a preferred embodiment of the present invention, after pressing the selection control button to allow one of the lighting time setting display lights to light on without other lighting time setting display lights, the central control module is able to start the power supply to the load end as well as the time countdown in accordance with the power supply time represented by the lighting time setting display light, and, also, the central control module can further, based on the remaining power supply time acquired by deducting the elapsed power supply time from the power supply time indicated by the lighting time setting display light, drive the light-on in one or more time setting display lights thereby indicating the remaining power supply time.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Refer first to FIGS. 1-4B, wherein a structure view, an integral structure view, a structure view for the DC power source supply module and electric circuit structure diagrams for the electric circuit board of the timing device according to the present invention are respectively shown. It can be appreciated from the Figures that the timing device 1 comprises a housing 12 and an electric circuit board 11, in which the electric circuit board 11 is installed within the housing 12, and the electric circuit board 11 includes an alternative current (AC) power source input module 111, a direct current (DC) power source supply module 112, an AC power source output module 114, a relay 113, a central control module 115, a relay driver circuit 116, a time setting display light set 117 having two or more time setting display lights 1171, 1172, 1173, 1174, 1175, 1176, 1177 and 1178, a selection control button 118, as well as a total time setting control button 119. Conjunctively with the electric circuit diagrams in FIG. 4, it can be understood that the AC power source input module 111 is electrically connected to a city electric power end 2 and used to input AC power to the DC power source supply module 112; also, it should be noticed that the N input in FIG. 4 indicates the ground line, the L input the fire wire, so only the L input is marked as 112. But, in application, it is required to simultaneously use the N input and the L input to achieve the objective of AC power input.

Figure 4A:
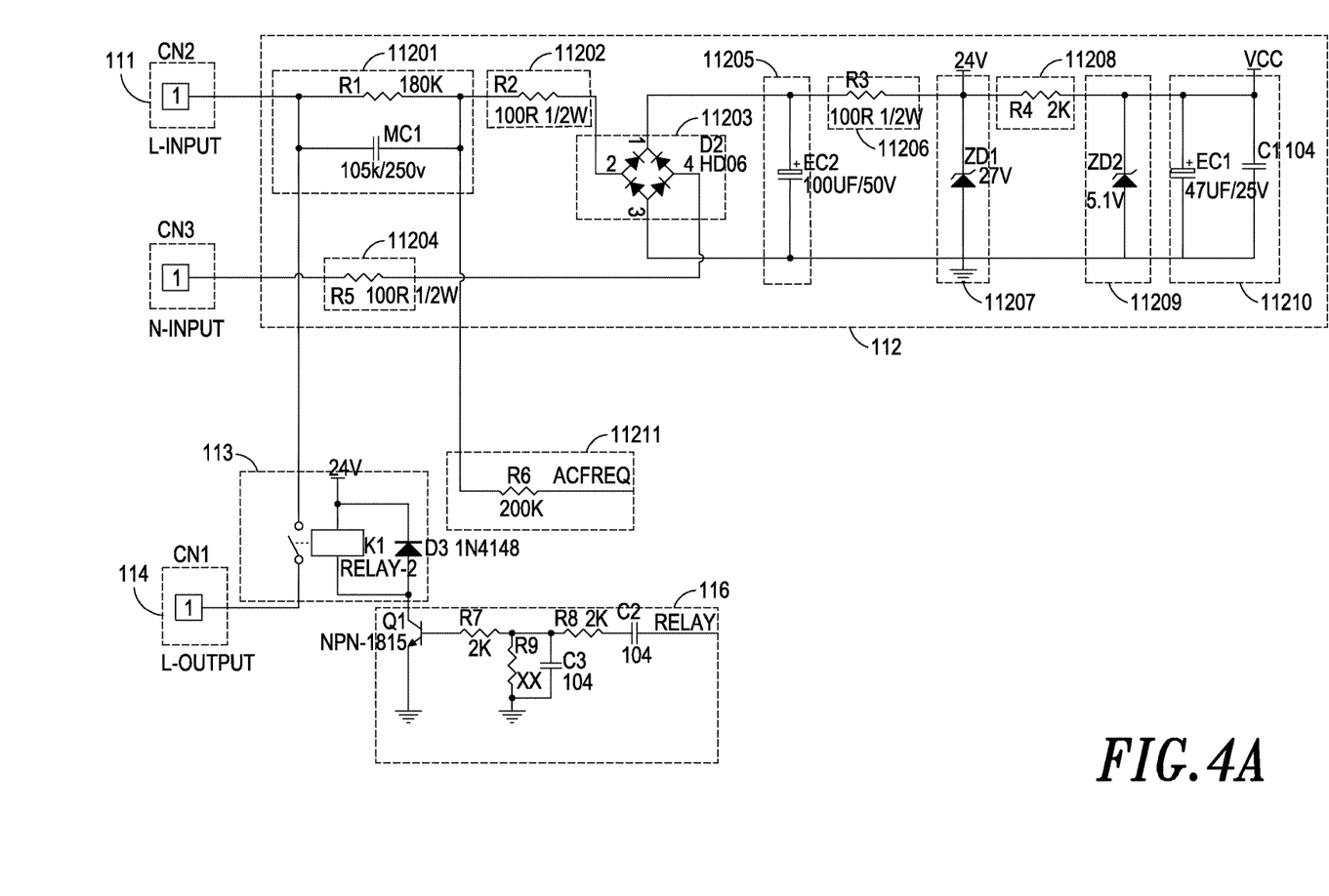
FIG. 4A shows an electric circuit structure diagram of the electric circuit board in the timing device according to the present invention.
Figure 4B:
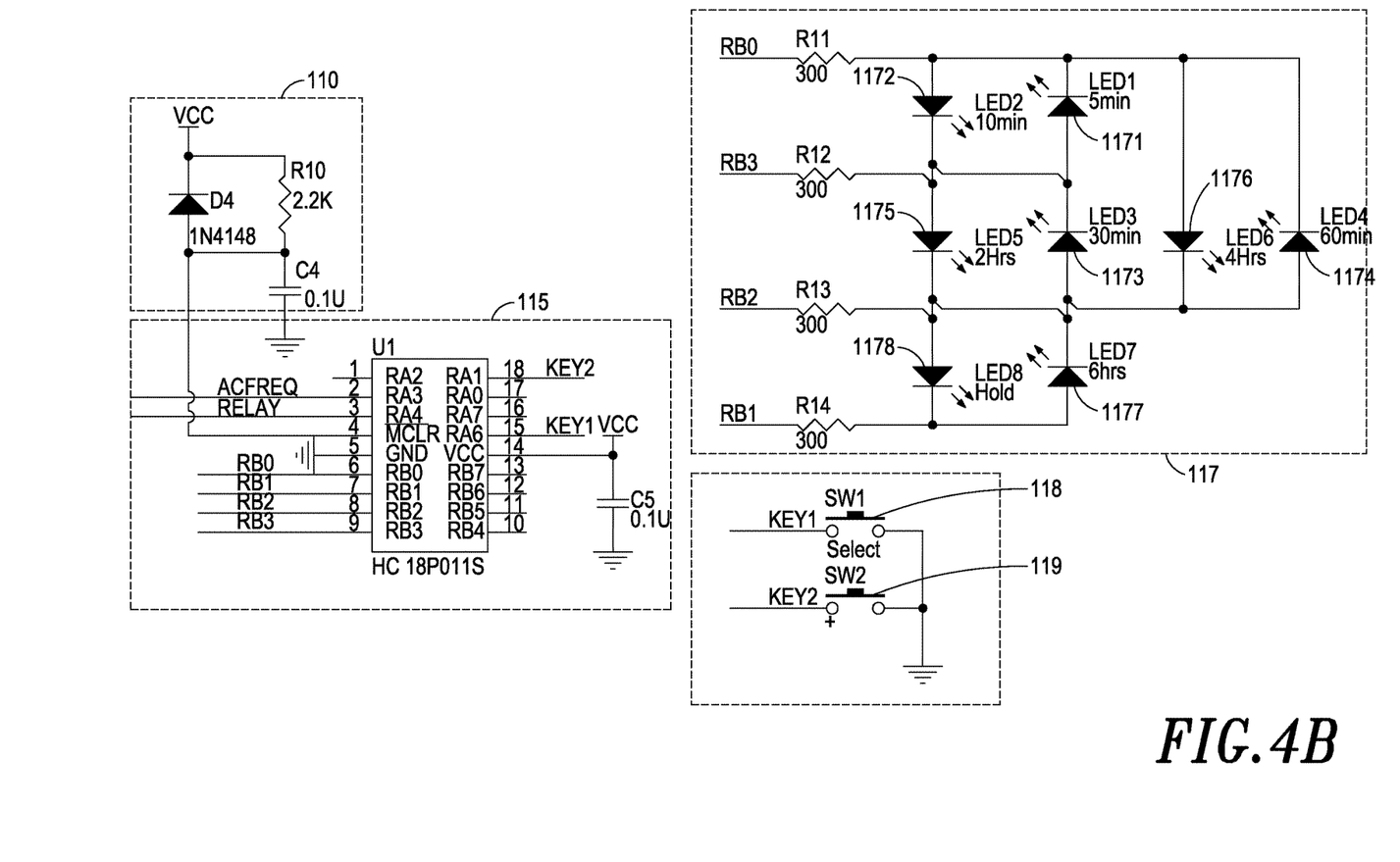
FIG. 4B shows an electric circuit structure diagram of the electric circuit board in the timing device according to the present invention.

In addition, the central control module 115 can drive the relay 113 to connect through by way of the relay driver circuit 116 such that the electric power can be provided to the AC power source output module 114 and the AC power source output module 114 can output AC power to the load end 3. Hence, upon pressing the selection control button 118 to cause the light-on in one of the time setting display lights without pressing once again the selection control button 118 or the total time setting control button 119, the central control module 115 can sum up the power supply times indicated by all of the lighting time setting display lights to a total power supply time and initiate the power supply to the load end 3 as well as the time countdown. Moreover, the central control module 115 can further refer to the remaining power supply time acquired by deducting the elapsed power supply time from the total power supply time to drive one or more time setting display lights to light on thereby indicating the remaining power supply time.

Figure 3:
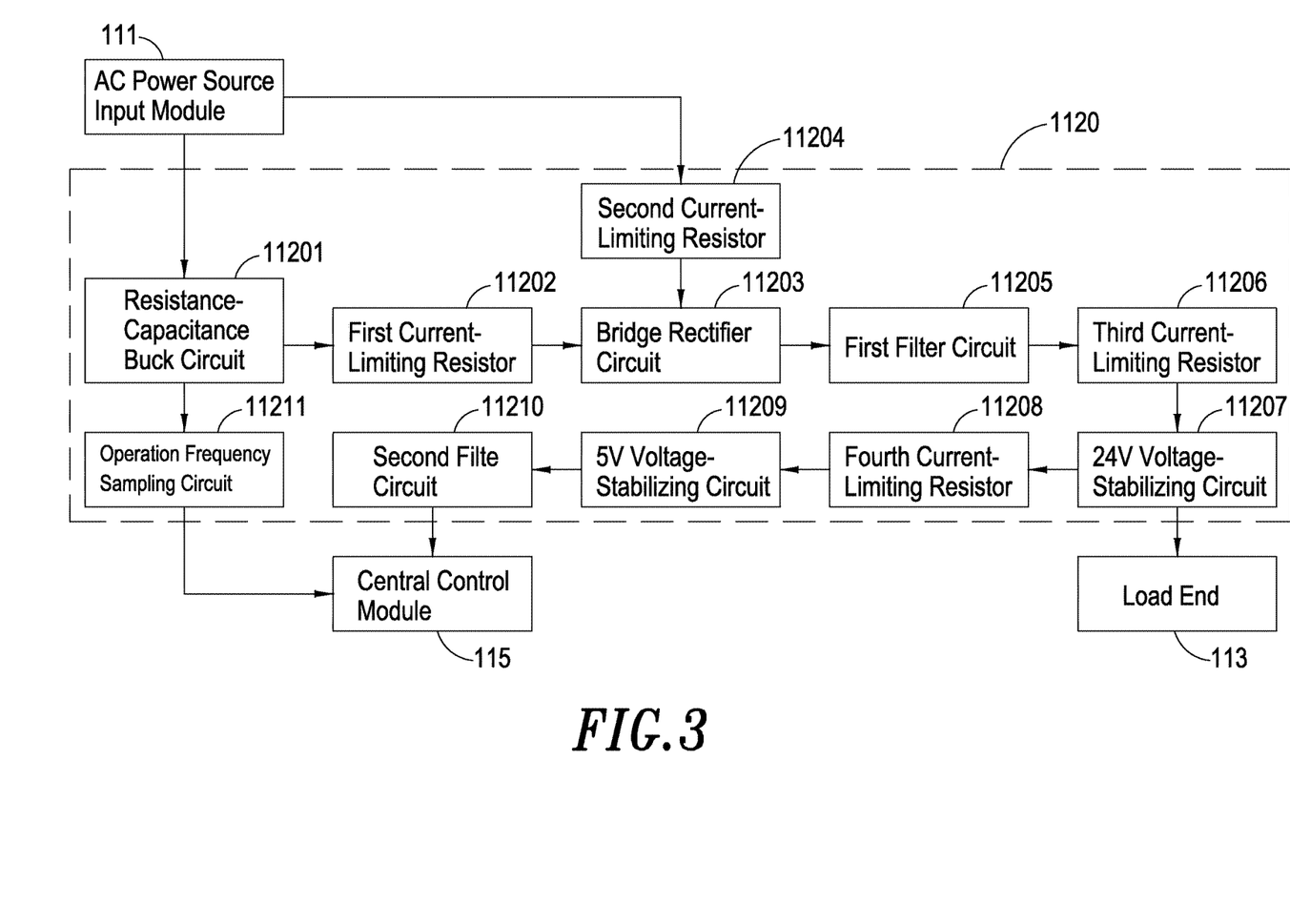
FIG. 3 shows a structure view of the DC power source supply module in the timing device according to the present invention.

Herein the DC power source supply module 112 can be applied to convert the AC power into the DC power. Specifically, the DC power source supply module 112 includes a resistance-capacitance buck circuit 11201, a first current-limiting resistor 11202, a bridge rectifier circuit 11203, a second current-limiting resistor 11204, a first filter circuit 11205, a third current-limiting resistor 11206, a 24V voltage-stabilizing circuit 11207, a fourth current-limiting resistor 11208, a 5V voltage-stabilizing circuit 11209, a second filter circuit 11210 and an operation frequency sampling circuit 11211.

Herein the resistance-capacitance buck circuit 11201 is used to restrict the maximum operation current by means of the capacitive resistance generated by the capacitor under a certain AC signal frequency. Also, the bridge rectifier circuit 11203 can be electrically connected to the resistance-capacitance buck circuit 11201 through a first current-limiting resistor 11202 so as to rectify the AC power inputted by the AC power source input module 111 into a pulsed DC power. Moreover, the second current-limiting resistor 11204 can be further installed between the AC power source input module and the bridge rectifier circuit.

The rectified pulsed DC power inputted by the bridge rectifier circuit can be transformed into stable DC power by means of the first filter circuit 11205. Next, through the 24V voltage-stabilizing circuit 11207 electrically connected between the third current-limiting resistor 11206 and the first filter circuit 11205, it is possible to voltage stabilize the DC power inputted by the first filter circuit 11205 to a voltage of 24V thereby supplying electric power to the relay 113 for operations.

Subsequently, with the 5V voltage-stabilizing circuit 11209 electrically connected to the 24V voltage-stabilizing circuit via the fourth current-limiting circuit 11208, it is possible to voltage stabilize the DC power inputted by the 24V voltage-stabilizing circuit to the voltage of 5V. Then, with the second filter circuit 11210, it is possible to voltage stabilize the DC power outputted by the 5V voltage-stabilizing circuit so as to provide stable DC power to the central control module 115 for operations. In addition, the operation frequency sampling circuit 11211 is connected between the resistance-capacitance buck circuit 11201 and the central control module 115 and capable of taking the AC signals from the city electric power end 2 to act as the operation counts for the central control module 115.

Furthermore, from FIG. 4B, it can be seen that the central control module 115 is further connected to a reset circuit 110 which is used to provide the reset signal to the central control module 115 upon re-powering.

Figure 1:
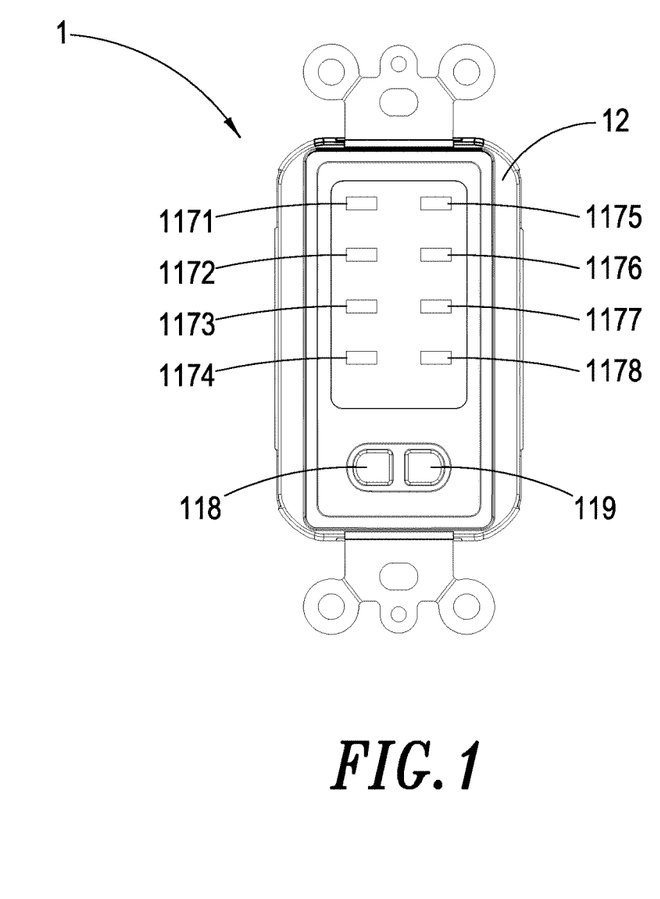
FIG. 1 shows a structure view of the timing device according to the present invention.
Figure 2A:
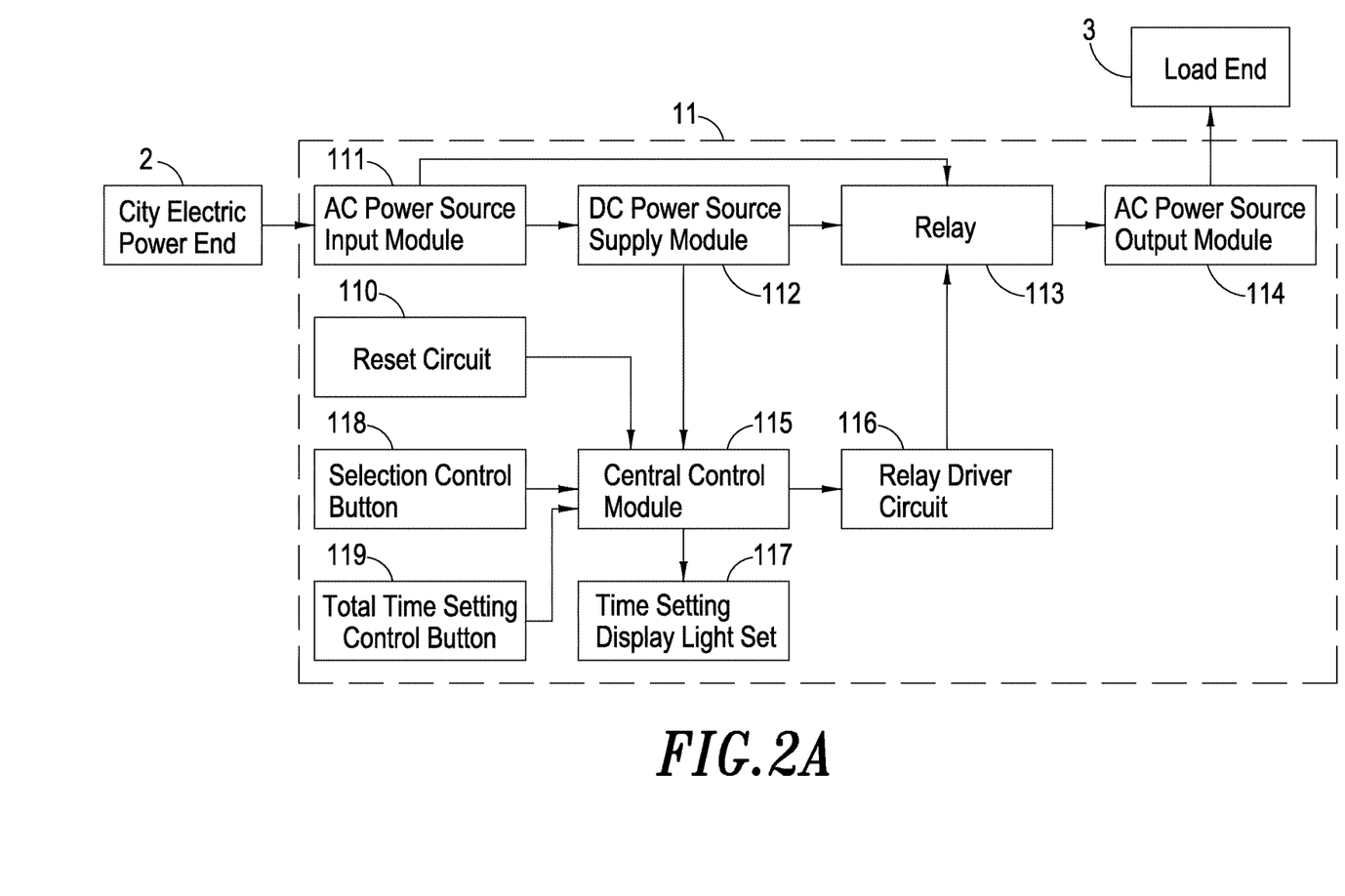
FIG. 2A shows an integral structure view of the timing device according to the present invention.
Figure 2B:
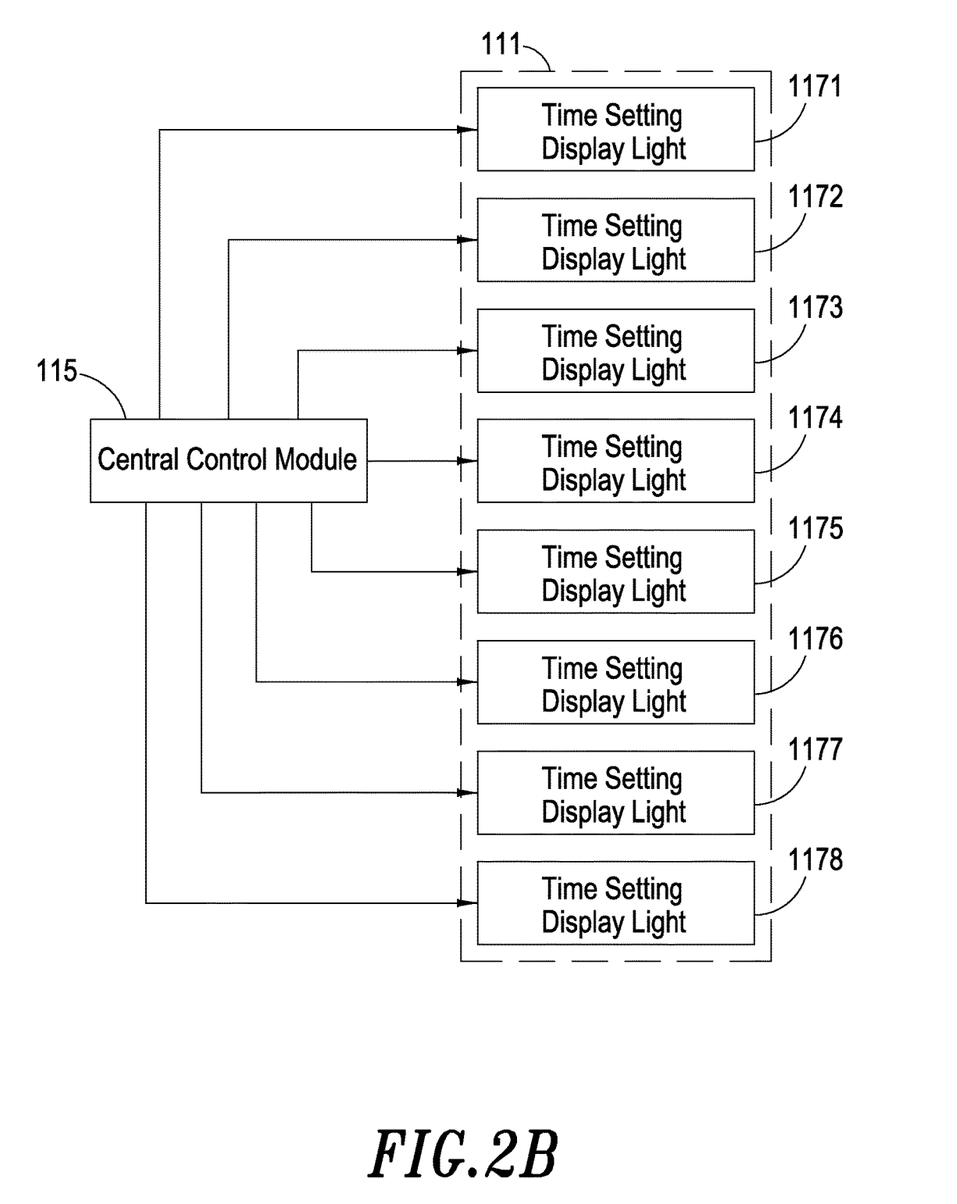
FIG. 2B shows a structure view of the time setting display light set on the timing device according to the present invention.

Herein, the time setting display lights 1171, 1172, 1173, 1174, 1175, 1176, 1177, 1178 in the present invention respectively represent a 5-minute time countdown, a 10-minute time countdown, a 30-minute time countdown, a 60-minute time countdown, a 2-hour time countdown, a 4-hour time countdown, a 6-hour time countdown and an endless output ON.

Meanwhile, the control buttons configured in the present invention include the selection control button 118 and the total time setting control button 119. Therefore, upon selecting one of the fixed time periods to operate, it is possible to first press the selection control button 118 such that the time setting display light 1171 blinks; on the other hand, in case of not choosing the 5-minute time countdown represented by the time setting display light 1171, it is possible to press the selection control button 118 once again, then the time setting display light 1171 lights off and the time setting display light 1172 blinks. Accordingly, by repetitively pressing the selection control button 118, the time setting display light 1178 blinks in the end; however, suppose none of such setting times are selected, the selection control button 118 can be pressed again to turn off the time setting display light 1178 and the timing device 1 is now in a completely no power supply status.

The following example illustrates the method for choosing the 2-hour time countdown, as below:

(1) pressing the selection control button 118 consecutively 5 times such that the time setting display light 1175 blinks, then releasing the selection control button 118 so that the time countdown may start in 5 seconds; in this way, the time setting display light 1175 lights on, which indicates the 2-hour time countdown has begun;

(2) as the remaining time countdown matching a certain fixed duration of time, lighting on the corresponding LED and lighting off the previous LED; for example, in case one hour remains with regards to the aforementioned time countdown, the time setting display light 1175 may light off, but the time setting display light 1174 may illuminate. Analogously, if the remaining time becomes 30 minutes, 10 minutes and 5 minutes, respectively, the corresponding time setting display light can light on and the previous time setting display light can light off; the similar approach also applies to other time settings, and suppose the device needs to be turned off any time there between, it is possible to press and hold the selection control button 118 for about 2 seconds to stop the power supply process and return to the inactive status.

The following example illustrates the method for choosing the endless ON in the device, as below:

(1) pressing the selection control button 118 consecutively 8 times such that the time setting display light 1178 blinks, and then releasing the selection control button 118 so the time countdown starts in about 5 second;

(2) at this point, the time setting display light 1178 keeps lighting on to supply continuously the electric power, and only when the selection control button 118 is pressed once again can the power supply stop.

In addition, the follow example describes the method concerning using the aforementioned fixed time periods for combination, as below:

(1) pressing first the selection control button 118 to choose the desired setting time, then pressing the total time setting control button 119 such that the blinking time setting display light now becomes long-lighting and the user can press again the selection control button 118;

(2) in this case, the time setting display light which indicates the least time and is currently in a non-lighting status may start to blink;

(3) when pressing again the selection control button 118, the time setting display light indicating the least time and being in a non-lighting status may light off, and the time setting display light indicating the second least time and being currently in a non-lighting status may start to blink;

(4) to choose the time setting display light indicating the second least time and being currently in a non-lighting status, pressing once again the total time setting control button 119 or releasing the selection control button 118 for about 5 seconds, in which the total power supply time is the summation of the supply times indicated by all of the lighting time setting display lights;

(5) for the above-said situation, at most 7 time setting display lights can be selected to illuminate; however, during the selection, if the time setting display light 1178 is chosen, then all earlier selections will be cancelled (i.e., the selected time setting display lights will light off), but only the time setting display light 1178 blinks, and after the time setting display light 1178 indicator blinks for about 5 seconds, the setting process is now completed so that the time setting display light 1178 can be long light-on which represents the non-stop device output ON.

Figure 7A:
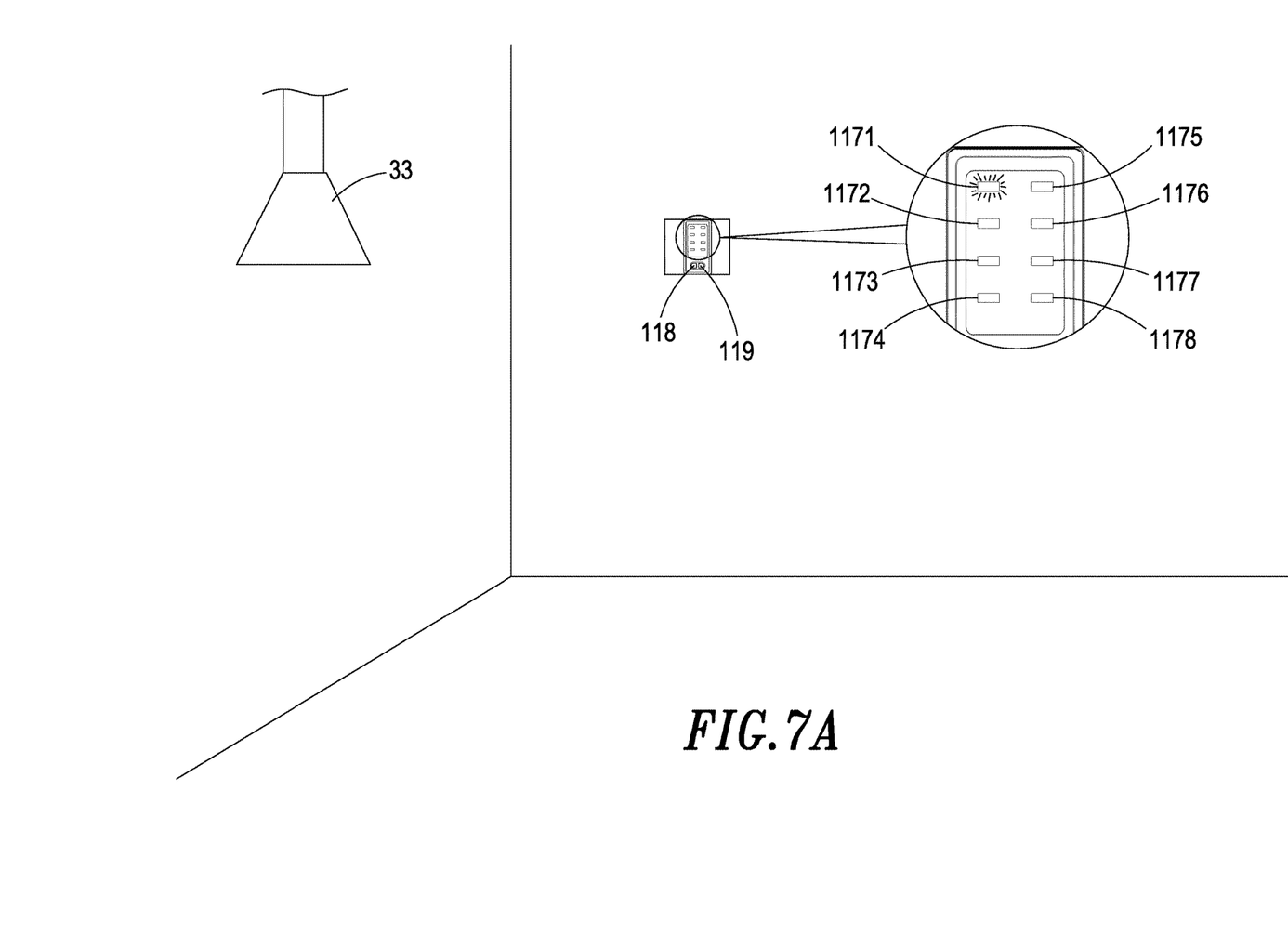
FIG. 7A shows an application view for a third embodiment of the timing device according to the present invention.
Figure 7B:
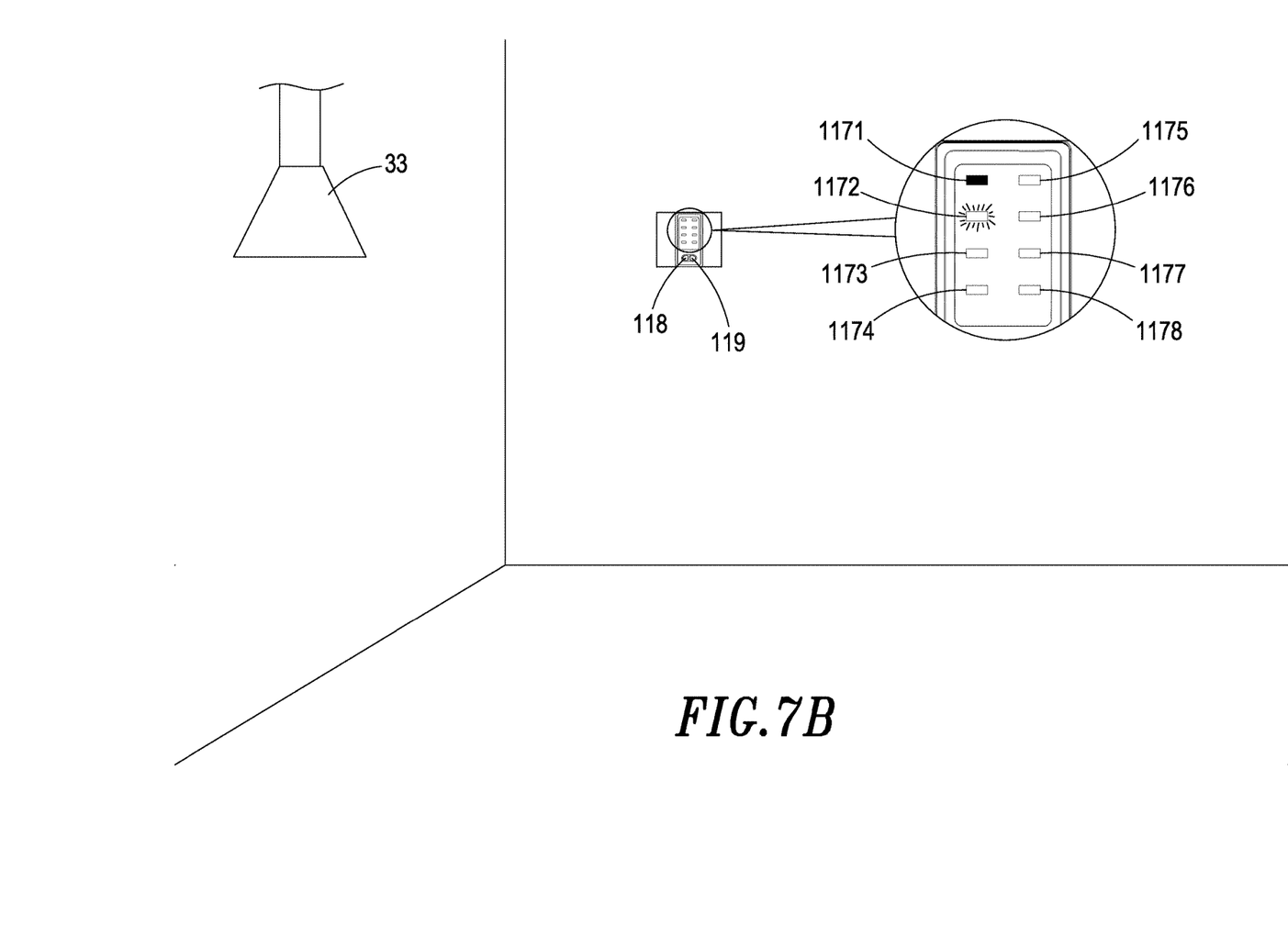
FIG. 7B shows an application view for the third embodiment of the timing device according to the present invention.
Figure 7C:
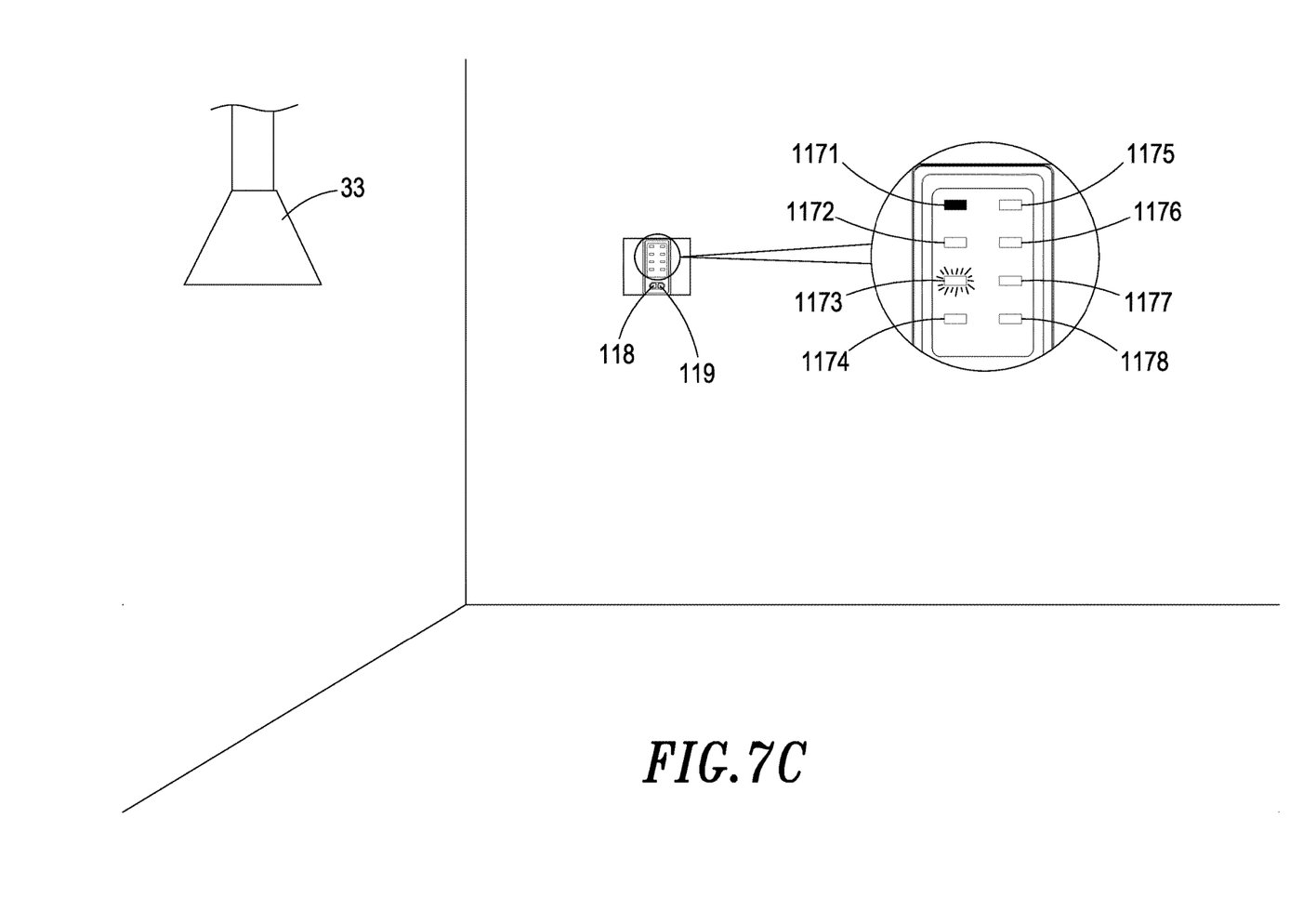
FIG. 7C shows an application view for the third embodiment of the timing device according to the present invention.
Figure 7D:
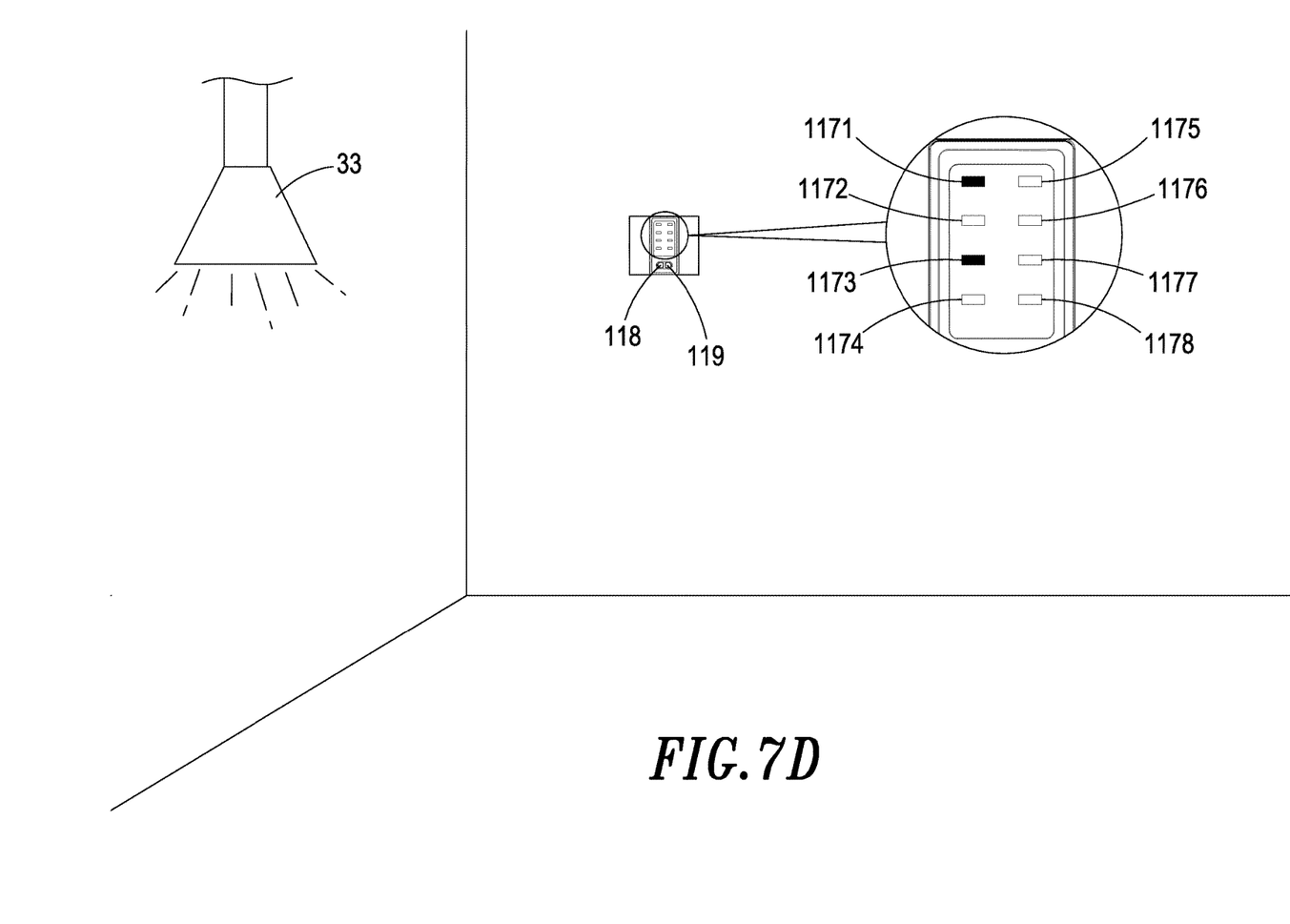
FIG. 7D shows an application view for the third embodiment of the timing device according to the present invention.

Furthermore, as shown in FIGS. 7A-7D, the following example illustrates the method for configuring a power output lasting 35 minutes to a lamp 33, as below:

(1) pressing the selection control button 118, as shown in FIG. 7A, so that the time setting display light 1171 blinks, and then pressing the total time setting control button 119, as shown in FIG. 7B to allow the long light-on in the time setting display light 1171;

(2) at this point, the time setting display light 1172 blinks, thus pressing once again the selection control button 118, as shown in FIG. 7C, the time setting display light 1172 lights off and the time setting display light 1173 blinks; after the time setting display light 1173 blinks for about 5 seconds, as shown in FIG. 7D, the time setting display light 1173 is now long lighting on, thereby completing the 35-minute time setting and allowing the lamp 33 to illuminate;

(3) when the remaining time matches a certain fixed time period, the corresponding time setting display light can light on and the previous time setting display light may light off. For example, suppose the remaining time for the above-said time setting is 10 minutes, the time setting display light 1172 lights on while the time setting display light 1173 stops; if the remaining time is 5 minutes, the time setting display light 1171 illuminates and the time setting display light 1172 lights off; in this way, at the end of the time countdown, all of the time setting display lights will be turned off;

(4) alternatively, in case the power supply needs to be terminated there between, it is also possible to press the selection control button 118 for about 5 seconds to directly stop the power supply and return to the inactive status.

Next, another example is set forth to explain the method for setting an output of 3 hours and 30 minutes, as below:

(1) pressing the selection control button 118 so that the time setting display light 1171 blinks, then, after pressing twice the selection control button 118, the time setting display lights 1171, 1172 may light off and the time setting display light 1173 starts to blink, and subsequently pressing the total time setting control button 119 to set the long light-on in the time setting display light 1173;

(2) as the time setting display light 1171 blinking now, then pressing again the selection control button 118 so that the time setting display light 1171 lights off and the time setting display light 1172 blinks; then, after pressing again the selection control button 118, the time setting display light 1172 lights off and the time setting display light 1174 blinks, thus further pressing the total time setting control button 119 to set the long light-on in the time setting display light 1174;

(3) following this, as the time setting display light 1171 blinking, then pressing again the selection control button 118 so that the time setting display light 1171 lights off and the time setting display light 1172 blinks; then, after pressing again the selection control button 118, the time setting display light 1172 lights off and the time setting display light 1175 blinks; after the time setting display light 1175 blinking for 5 seconds, the time setting display light 1175 is now set to long light-on, thus completing the time setting of 5 hours and 30 minutes and the device output ON.

The following example illustrates the method for setting the light-on in all of the seven time setting display lights, as below:

(1) pressing the selection control button 118 so the time setting display light 1171 blinks, then pressing the total time setting control button 119 for the long light-on in the time setting display light 1171, and the time setting display light now blinks;

(2) after pressing the total time setting control button 119, the time setting display light 1172 may long light on and the time setting display light 1173 blinks;

(3) pressing again the total time setting control button 119, the time setting display light 1173 may long light on and the time setting display light 1174 blinks;

(4) pressing again the total time setting control button 119, the time setting display light 1174 may long light on and the time setting display light 1175 blinks;

(5) pressing again the total time setting control button 119, the time setting display light 1175 may long light on and the time setting display light 1176 blinks;

(6) after pressing again the total time setting control button 119, the time setting display light 1176 may long light on, and the time setting display light 1177 blinks, thus after the time setting display light 1177 blinking for 5 seconds, the time setting display light 1177 will long light on.

Subsequently, the follow example describes the method of time countdown after completing the setup process, as below:

(1) when the time countdown begins, the time setting display lights can light up based on the remaining time (e.g., in case the remaining time ranges 31~60 minutes, the time setting display light 1174 illuminates;

(2) if multiple time setting display lights are light-on, the time setting display light representing the least value can be activated (for example, initially the time setting display lights respectively indicating 2 hours and the 60 minutes may light on to represent a 3-hour countdown; then, when the remaining time becomes 2 hours and 30 minutes, the time setting display lights respectively indicating 2 hours and the 30 minutes can be turned on, and so forth;

(3) upon detecting no button are pressed for 5 seconds, the time countdown begins, so the central control module 115 selects the LED to be long light-on and outputs a high level to the RELAY pin; thus, until the time countdown ends, it signifies an OFF and outputs a low level to the RELAY pin;

(4) the blinking mode of the time setting display lights may be light-on for 0.2 seconds, light-off for 0.2 seconds, light-on first then light-off;

(5) during the setup process, when the time setting display light is in the blinking mode, it will go into long light-on after a 5-second confirmation, or else by pressing the total time setting control button 119 to make the selected LED to be long light-on;

(6) while already in the time countdown process, pressing the selection control button 118 will not stop the time countdown, but turn off the currently lighting time setting display light and the next time setting display light starts to blink; thus by pressing again the selection control button 118, the blinking time setting display light will be off and the next time setting display light blinks, so that, after releasing the selection control button 118 for about 5 seconds, the time countdown starts and the blinking time setting display light can illuminate to extend the duration of the time countdown;

(7) also, while already in the time countdown process, pressing the total time setting control button 119 will not stop the time countdown, but the non-lighting time setting display light indicating the least time value starts to blink; thus by pressing again the selection control button 118, the next time setting display light will blink, but the previous blinking time setting display light now lights off; and then pressing the selection control button 118, once again, the blinking time setting display light now is off, and the further next time setting display light blinks; as such, after releasing the selection control button 118 for about 5 seconds, the time countdown starts and the blinking time setting display light illuminates to extend the duration of the time countdown.

Figure 5:
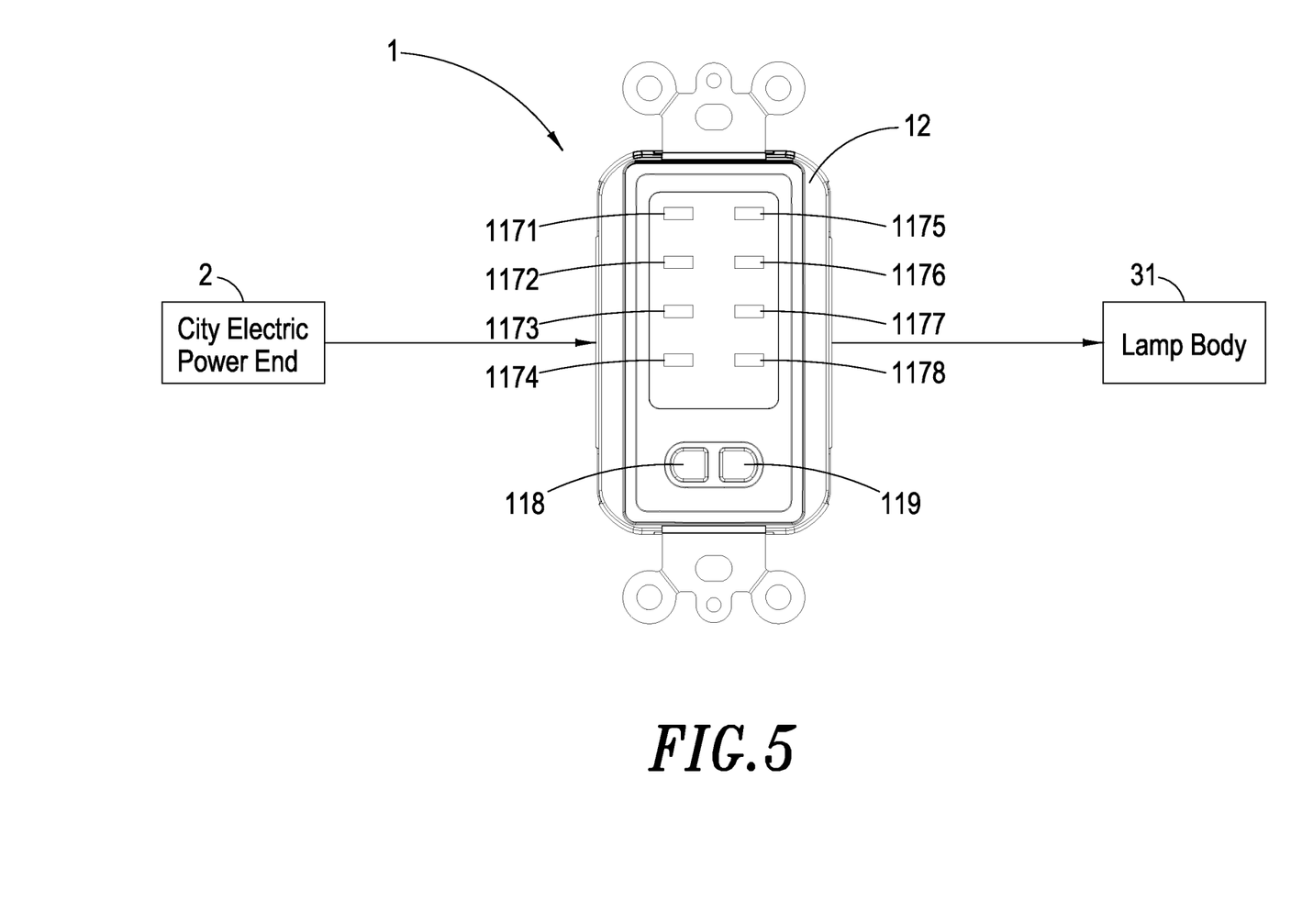
FIG. 5 shows an application view for a first embodiment of the timing device according to the present invention.
Figure 6:
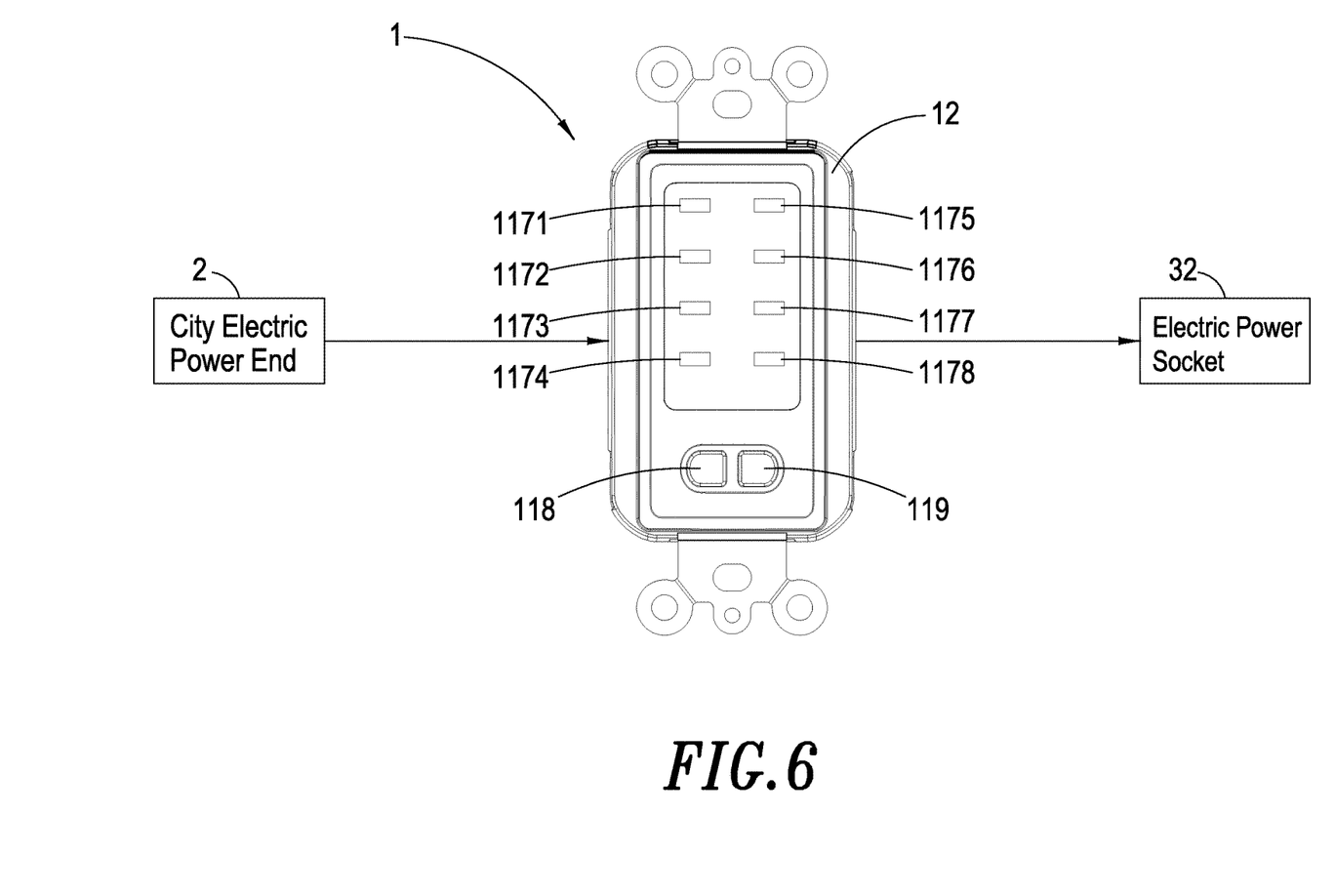
FIG. 6 shows an application view for a second embodiment of the timing device according to the present invention.

The timing device according to the present invention may be buried into a wall or otherwise combined with the apparatus of the load end 3. As shown in FIG. 5, the load end is depicted as a lamp body 31, and upon electrically connecting the timing device 1 to the lamp body 31, it is possible to control the power on and power off of the lamp body 31. In addition to the lamp body 31 in FIG. 5, as shown in FIG. 6, the AC power source output module 114 of the timing device 1 can be power socket holes (not shown), so an electric power socket 32 can be plugged onto the power socket holes thereby allowing the timing device 1 to control the duration of power supply times for the electric power socket 32. Hence, the timing device 1 can adjust and control the length of power supply time in the electric power socket 32.

Although the present invention has been disclosed through the detailed descriptions of the aforementioned embodiments, such illustrations are by no means used to restrict the present invention. Skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A timing device, comprising:
   an alternative current (AC) power source input module, used to input AC power;
   a direct current (DC) power source supply module, which is electrically connected to the AC power source input module and used to convert the AC power into the DC power;
   an AC power source output module, which is electrically connected to a load end in order to output the AC power to the load end;
   a relay, which is electrically connected to the AC power source input module, the DC power source supply module and the AC power source output module, wherein the relay is used to control whether the AC power inputted by the AC power source input module should pass through the relay to supply the power to the AC power source output module such that the AC power source output module can output the AC power to the load end;
   a central control module, which is electrically connected to the DC power source supply module in order to control the integral operation mechanism of the timing device;
   a relay driver circuit, which is electrically connected to the central control module and the relay, in which the central control module is able to connect to the relay by means of the relay driver circuit such that the power can be supplied to the AC power source output module;

a time setting display light set, which includes at least two or more time setting display lights and is electrically connected to the central control module, wherein each time setting display light represents a power supply time, and the light-on or light-off in any one of the time setting display lights represents the status change in the control of the central control module;

a selection control button, which is electrically connected to the central control module and is used to be pressed to select the power supply time, wherein pressing the selection control button can result in the light-on or light-off of such time setting display lights;

a total time setting control button, which is electrically connected to the central control module and is used to be pressed to confirm the power supply time option, wherein, upon pressing the selection control button thus leading to light-on in one of the time setting display lights, it is possible to press once again the total time setting control button to confirm the input of the time represented by the time setting display light; and in case of pressing the selection control button thereby enabling the light-on in one of the time setting display lights without subsequently pressing once again the selection control button or the total time setting control button, the central control module is able to sum up the power supply times represented by all of the lighting time setting display lights to obtain a total power supply time, and start the power supply to the load end as well as the time countdown, and, also, the central control module can further, based on the remaining power supply time acquired by deducting the elapsed power supply time from the total power supply time, drive the light-on in one or more time setting display lights thereby indicating the remaining power supply time.

2. The timing device according to claim 1, wherein a light-on in a time setting display light is configured to represent an endless power supply time.

3. The timing device according to claim 1, wherein the light-off in all of the time setting display lights represents no power supply.

4. The timing device according to claim 1, wherein totally eight (8) time setting display lights are configured, respectively indicating a power supply time of 5 minutes, 10 minutes, 30 minutes, 60 minutes, 2 hours, 4 hours, 6 hours and endless power supply.

5. The timing device according to claim 1, wherein, after pressing the total time setting control button, the central control module can re-select from the non-lighting time setting display lights in order to drive the time setting display light representing the least power supply time to light on.

6. The timing device according to claim 5, wherein pressing once again the selection control button allows the lighting time setting display lights to light off, and enables the next time setting display light representing the second least power supply time to light on.

7. The timing device according to claim 1, wherein, after pressing the selection control button to allow one of the lighting time setting display lights to light on without other lighting time setting display lights, the central control module is able to start the power supply to the load end as well as the time countdown in accordance with the power supply time represented by the lighting time setting display light, and, also, the central control module can further, based on the remaining power supply time acquired by deducting the elapsed power supply time from the power supply time indicated by the lighting time setting display light, drive the light-on in one or more time setting display lights thereby indicating the remaining power supply time.

8. The timing device according to claim 1, wherein the DC power source supply module further includes:
a resistance-capacitance buck circuit, which is used to limit the maximum operation current by means of the capacitive resistance generated by the capacitor under a certain AC signal frequency;
a bridge rectifier circuit, which is electrically connected to the resistance-capacitance buck circuit through a first current-limiting resistor so as to rectify the AC power inputted by the AC power source input module into a pulsed DC power;
a second current-limiting resistor, which is connected between the AC power source input module and the bridge rectifier circuit;
a first filter circuit, which is electrically connected to the bridge rectifier circuit in order to convert the rectified pulsed DC power inputted by the bridge rectifier circuit into the stable DC power;
a 24V voltage-stabilizing circuit, which is electrically connected to a third current-limiting resistor and the first filter circuit so as to voltage stabilize the DC power inputted by the first filter circuit to a voltage of 24V thereby supplying electric power to the relay for operations;
a 5V voltage-stabilizing circuit, which is electrically connected to the 24V voltage-stabilizing circuit via a fourth current-limiting circuit thereby voltage stabilizing the DC power inputted by the 24V voltage-stabilizing circuit to the voltage of 5V;
a second filter circuit, which is electrically connected to the 5V voltage-stabilizing circuit in order to voltage stabilize the DC power outputted by the 5V voltage-stabilizing circuit thereby supplying the stabilized DC power to the central control module for operations; and
an operation frequency sampling circuit, which is connected between the resistance-capacitance buck circuit and the central control module and capable of taking the AC signals from the city electric power end to act as the operation counts for the central control module.

9. The timing device according to claim 1, further comprising a reset circuit electrically connected to the central control module, in which the reset circuit is, upon repowering, used to provide the central control module with the reset signal.

* * * * *